United States Patent
Smith et al.

(10) Patent No.: US 10,424,037 B2
(45) Date of Patent: Sep. 24, 2019

(54) SECONDARY CARD TAP SYSTEM

(71) Applicant: Cubic Corporation, San Diego, CA (US)

(72) Inventors: Gavin Smith, Crawley (GB); Tom Vilhelmsen, Holbaek (DK); Steffen Reymann, Guildford (GB); Christopher Golding, Godalming (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/268,140

(22) Filed: Feb. 5, 2019

(65) Prior Publication Data

US 2019/0244319 A1 Aug. 8, 2019

Related U.S. Application Data

(60) Provisional application No. 62/626,507, filed on Feb. 5, 2018.

(51) Int. Cl.
*G06K 7/00* (2006.01)
*G06Q 50/30* (2012.01)
*H04W 12/00* (2009.01)
*G06Q 20/10* (2012.01)

(52) U.S. Cl.
CPC ......... *G06Q 50/30* (2013.01); *H04W 12/001* (2019.01); *G06Q 20/10* (2013.01)

(58) Field of Classification Search
USPC .......................... 235/375–385; 705/5, 35–45
See application file for complete search history.

(56) References Cited

U.S. PATENT DOCUMENTS

| | | | |
|---|---|---|---|
| 2005/0092831 A1* | 5/2005 | Sandoval | G07B 15/04 235/382 |
| 2010/0211505 A1* | 8/2010 | Saunders | G06Q 20/10 705/64 |

FOREIGN PATENT DOCUMENTS

| | | |
|---|---|---|
| CN | 106709470 A | 5/2017 |
| EP | 2991041 A2 | 3/2016 |

(Continued)

OTHER PUBLICATIONS

International Search Report and Written Opinion dated May 7, 2019 in related PCT application No. PCT/US2019/016639, 15 pgs.

*Primary Examiner* — Matthew Mikels
(74) *Attorney, Agent, or Firm* — Kilpatrick Townsend & Stockton LLP (57) ABSTRACT

A secondary validator includes a communications interface with a first antenna and a second antenna having a shorter signal range than the first antenna. The validator also includes a processor and a memory having instructions that, when executed by the processor cause the validator to receive, using the first antenna, vehicle information from a first vehicle that is within a signal range of the first antenna. The vehicle information includes route information associated with the first vehicle. The validator provides an indication for a passenger that has exited the first vehicle to check out, reads checkout information from a fare media using the second antenna, detects another vehicle present within a signal range of the first antenna, and provides the checkout information and at least a portion of the transit vehicle information to a primary validator positioned on the another vehicle for subsequent transmission to a transit system back office.

20 Claims, 6 Drawing Sheets

(56) References Cited

FOREIGN PATENT DOCUMENTS

JP          2007079928  A      3/2007
WO    WO-2017096307  A1  *   6/2017   ............. G07B 15/02

* cited by examiner

SECONDARY CARD TAP SYSTEM

CROSS-REFERENCES TO RELATED APPLICATIONS

This Application claims priority to U.S. Provisional Patent Application No. 62/626,507, filed Feb. 5, 2018, entitled "SECONDARY CARD TAP SYSTEM," the entire disclosure of which is hereby incorporated by reference, for all purposes, as if fully set forth herein.

BACKGROUND OF THE INVENTION

Current mass transit systems (e.g., subway and other rail, buses, etc.) may require a passenger to use fare media (such as a closed-loop smartcard, contactless Europay, Mastercard, and Visa (EMV) card, etc.) to not only "tap in" to a system (e.g., swiping or tapping the fare media at a gate, turnstile, or other access point in a subway station, bus, etc.) to indicate the beginning of a passenger's journey within the transit system, but may also require a passenger to further "tap out" of the system to indicate the end of the passenger's journey within the transit system. This can enable the transit system to calculate an appropriate fare to charge the passenger for the journey. Problematically, however, a transit system may penalize a passengers who have failed to correctly tap out from a journey by charging them a maximum fare. This problem may be particularly difficult in the case of buses, where (unlike an immobile gate at a subway station) a customer may not be able to easily return to the access point and tap out, even if notified that they failed to tap out. The passenger may need to manually rectify the issue via a web portal (if their card or other fare media is registered to an account) or by calling the transit system's service team who can complete the journey manually at their back office.

BRIEF SUMMARY OF THE INVENTION

Embodiments of the present invention provide secondary validator units are usable by patrons to check out of transit systems, such as buses, trains, and the like, after the patrons have exited the vehicles. This is particularly useful for patrons that accidentally forget to check out before exiting the vehicle, as the patrons are given a second opportunity to check out. Additionally, the secondary validator may be positioned at transit stations or stops, which may allow patrons to checkout outside of the vehicle, which may eliminate queuing at a primary validator positioned within the vehicle, thereby increasing passenger throughput and allowing transit stops to be shorter. Additionally, embodiments provide secondary validators that do not include direct communications links with a back office of the transit system, but instead relay communications to the back office using the primary validators of the transit vehicles. This allows the secondary validators to have less sophisticated communications interfaces, which makes the secondary validators cheaper and easier to maintain, and also allows the secondary validators to be placed in remote areas where long range networking is impossible and/or very expensive.

In one embodiment, a secondary validator is provided. The secondary validator may include a communications interface having a first wireless antenna and a second wireless antenna. The first wireless antenna may have a greater signal range than the second wireless antenna. The secondary validator may also include a processor and a memory having instructions stored thereon that, when executed by the processor cause the secondary validator to receive, using the first wireless antenna, transit vehicle information from a first transit vehicle that is within a signal range of the first wireless antenna. The transit vehicle information may include route information associated with the first transit vehicle. The instructions further cause the secondary validator to provide an indication for a passenger that has exited the first transit vehicle to check out and read checkout information from a fare media using the second wireless antenna of the secondary validator. The instructions may also cause the secondary validator to detect a second transit vehicle present within a signal range of the first wireless antenna and provide, using the first wireless antenna, the checkout information from the fare media and at least a portion of the transit vehicle information to a primary validator positioned on the second transit vehicle for subsequent transmission to a transit system back office.

In another embodiment, a method of validating a transit media is provided. The method may include receiving, using a first wireless antenna of a secondary validator positioned proximate a transit stop, transit vehicle information from a first transit vehicle that is within a signal range of the first wireless antenna. The transit vehicle information may include route information associated with the first transit vehicle. The method may also include providing an indication for a passenger that has exited the first transit vehicle to check out using the secondary validator and reading checkout information from a fare media using a second wireless antenna of the secondary validator. The second wireless antenna may have a shorter signal range than the first wireless antenna. The method may further include detecting a second transit vehicle present within a signal range of the first wireless antenna and providing, using the first wireless antenna, the checkout information from the fare media and at least a portion of the transit vehicle information to a primary validator positioned on the second transit vehicle for subsequent transmission to a transit system back office.

In another embodiment, a method of validating a transit media includes receiving, at a first wireless antenna of a secondary validator positioned proximate a transit stop, an indication from a validation detection system of a first transit vehicle that a passenger has exited a first transit vehicle without checking out of the first transit vehicle. The indication may be received while the first transit vehicle is located within a signal range of the first wireless antenna. The method may also include receiving, using the first wireless antenna, transit vehicle information from the first transit vehicle. The transit vehicle information may include route information associated with the first transit vehicle. The method may further include providing an indication for a passenger that has exited the first transit vehicle to check out using the secondary validator, and reading checkout information from a fare media using a second wireless antenna of the secondary validator. The second wireless antenna may have a shorter signal range than the first wireless antenna. The method may also include detecting a second transit vehicle present within the signal range of the first wireless antenna and providing, using the first wireless antenna, the checkout information from the fare media and at least a portion of the transit vehicle information to a primary validator positioned on the second transit vehicle for subsequent transmission to a transit system back office.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to fare collection in mass transit. That said, a person of ordinary skill in the art will understand that alternative embodiments may vary from the embodiments discussed herein, and alternative applications may exist.

Embodiments of the invention described herein address these and other issues by enabling passengers that are required to tap out with their fare media at the end of a journey to rectify a missed tap in an easy and convenient manner. In particular, embodiments utilize secondary, limited functionality reader, which may be installed near the point of exit (e.g., at a bus stop) which can interact with the passenger's fare media so the journey can be completed at the back office the next time the passenger uses their fare media at a conventional fare reader (e.g., the next time they travel). The secondary reader can complete the transaction by, for example, (1) writing journey information to the fare media, which, when it comes in contact with a fully-functional validator, may provide the journey information to the fully-functional validator, which can complete the transaction for the journey, (2) replay a full transaction record it received from the primary validator over a local radio link to the fare media, or (3) reading relevant data from the fare media, storing it, and sending it to a fully-functional validator (e.g., via wireless medication) the next time one comes into connection range (e.g., the next time a bus comes near a bus stop at which the secondary validator is located). As such, the secondary reader may not need to have a (potentially expensive) connection to the back office, it can function autonomously at the bus stop location. According to some embodiments, the passengers may be reminded that they haven't tapped out and allows them to tap their card on the secondary reader at the bus stop.

Embodiments of the invention may implement a number of novel ideas. For instance, embodiments may provide a reminder system that recognizes passengers who have missed to tap out, alerts them as they leave the vehicle, and guides them to the secondary validator.

Embodiments may additionally or alternatively utilize a secondary validator, which can receive information from the bus over a short range wireless link to be dynamically configured for a set amount of time, enabling the secondary validator to set information on the passengers card that allows later rectification of the journey. According to some embodiments, this information may include a timestamp, location, and/or bus/route number. The information set by the secondary reader additionally or alternatively may be used by a fully connected validator, allowing the back office to complete the passengers journey. If information only consists of time and location, the back office may then use a time table and live bus tracking information to retrieve journey details (e.g., bus/route number) required to complete the journey. Moreover, information sent from bus to reader can potentially be a complete fare media transaction, in which case the secondary reader may act as a proxy for the bus validator.

Embodiments of the invention may therefore include one or more of the following advantages. For example, embodiments may provide an easy and convenient way for passengers to immediately rectify a missed tap, limit the need for passengers to contact a transit system's service staff, ease congestion when leaving the bus, and/or improve passenger satisfaction. It can also serve as a reminder to the passenger next time the passenger needs to tap out.

Figure 1:
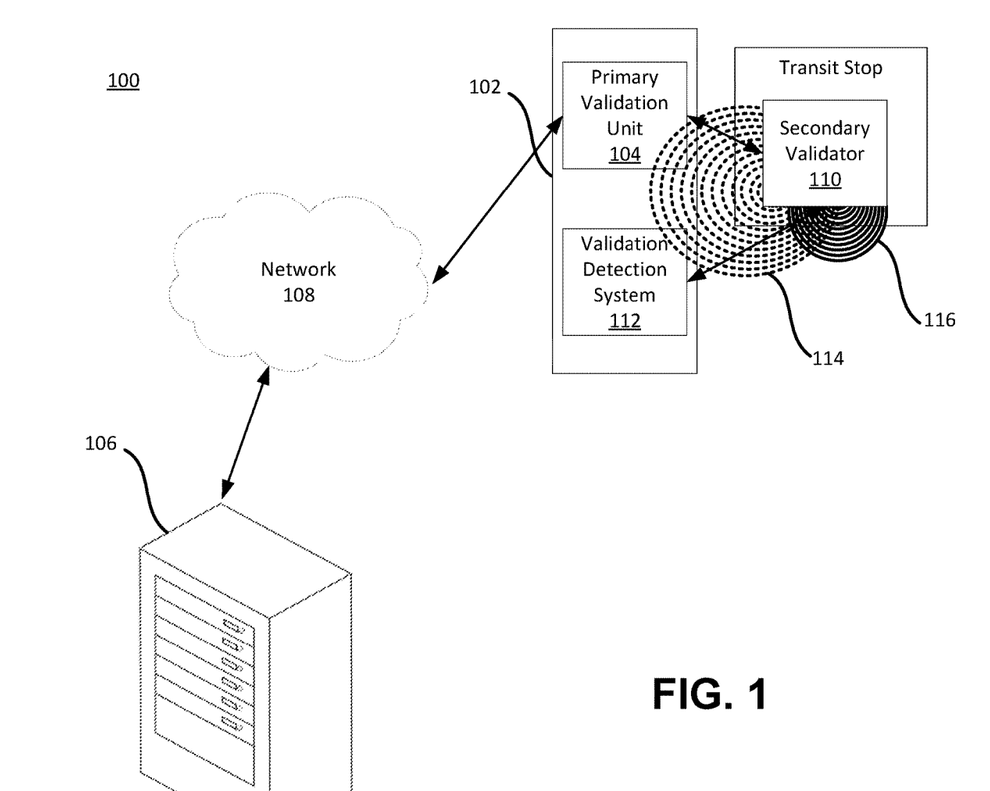
FIG. 1 illustrates a system for validating transit media according to embodiments of the invention.

Turning now to FIG. 1, one embodiments of a system 100 for validating fare media is shown. System 100 includes a number of transit vehicles 102, such as buses, trains, shuttles, shared ride vehicles, and the like. Each of the transit vehicles 102 may be equipped with a primary validation unit 104. Each primary validator or validation unit 104 may be in wireless communication with a back office 106 of the transit system over one or more networks 108. For example, the network 108 may include a cellular data networks, such as 3G, 4G LTE, 5G, and/or future cellular networks, WLAN, WiMAX, and/or other wireless network technologies. The primary validation unit 104 may track and/or receive information related to a route of the transit vehicle 102, including timestamps associated with various locations and/or stops of the transit vehicle 102, route names and routing directions of the transit vehicle, real-time and/or historical location data of the transit vehicle, In some embodiments, the primary validation unit 104 may be used by passengers of the transit vehicle 102 to check in and out of the transit vehicle 102 such that a proper transit fare may be calculated and charged for a particular trip. In such embodiments, the primary validation units 104 may track when a passenger use a fare media (such as a mobile phone or other mobile electronics device, smart card, EMV card, and/or other fare media) to tap or otherwise interact with the primary validation unit 104. These interactions may allow the primary validation unit 104 to collect information associated with a transit passenger and/or fare media. For example, timestamps of check ins and check outs, identifiers of passengers and/or the fare media that havoc checked in and/or out of the transit vehicle 102, payment details, stored value data associated with fare media, and the like may be collected using the primary validation unit 104.

In some embodiments, some or all of the transit vehicles 102 may include a validation detection system 112. The validation detection system 112 may include an imaging device, such as a 3D camera, other camera, infrared tracking system, and/or other device that is capable of monitoring passengers on board the transit vehicle 102 and determining (either alone or in conjunction with the primary validation unit 104) whether each passenger has properly and successfully checked out of the transit vehicle 102 prior to exiting the transit vehicle 102.

The back office 106 may include one or more computing systems, such as servers, network systems, network attached storage systems, and the like. The back office 106 may collect from each transit vehicle 102 (typically via its associated primary validation unit 104) some or all of the check in and/or check out information (which may include the information associated with a transit passenger and/or fare media) and/or information related to the route of a transit vehicle 102. The back office 106 may use some or all of this information to calculate an appropriate transit fare for each passenger (such as based on check in and check out information, route information, timestamps, etc.), and may then charge the transit fare to the fare media and/or other account associated with the fare media (such as when the fare media is a mobile phone) associated with the check in and checkout information.

The system 100 may also include one or more secondary validators 110, with some or all of the transit stops (such as train stations and/or bus stops) having one or more secondary validators 110. Typically, the secondary validators 110 do not have direct communication connections with the back office 106. This allows the secondary validators 110 to be produced and maintained easier and at lower costs. The secondary validators 110 may interact with fare media to allow passengers to check out of transit vehicles 102 even after the passenger has exited the transit vehicle 102. This allows either 1) passengers who have forgotten to check out and/or otherwise validate their fare media at a primary validation unit 104 prior to exiting the transit vehicle or 2) all passengers of the transit vehicle 102 to check out of the transit vehicle 102 after exiting the transit vehicle 102, (which may help reduce logjams near a primary validation unit 104 on a transit vehicle 102 as passengers attempt to exit, which in turn improves passenger throughput, especially in embodiments where a transit stop has multiple secondary validators 110). The secondary validator 110 can help to complete a transit ride transaction by writing data to the fare media or reading relevant data from the fare media and storing the data for later use. In the first scenario where data is written to the fare media, the data may be provided to the back office 106 for calculation of a transit fare for the previous ride the next time the fare media is presented to a primary validation unit 104 and/or other reader that is in networked communication with the back office 106. In the latter scenario where data from the fare media is stored on the secondary validator 110, some or all of the stored data may be communicated to a fully-functional pirate validation unit 104 over a wireless connection the next time a transit vehicle 102 comes within a signal connection range of the secondary validator 110 (i.e., the next time a bus comes near a bus stop at which the secondary validator 110 is located). Once the data is received by the primary validation unit 104, the primary validation unit 104 may subsequently pass some or all of the data to the back office 106, thereby enabling the back office 106 to calculate a proper fare for the fare media.

Typically, each of the secondary validators 110 will include a first wireless antenna for communicating with nearby transit vehicles 102 (and oftentimes, the primary validation units 104 and/or other validation detection systems 112 disposed thereon) and a second wireless antenna for communicating with fare media that are within close proximity of the secondary validator 110. Typically, the first wireless antenna may have a larger signal range 114 than the signal range 116 of the second wireless antenna. For example, the first wireless antenna may operate using Wi-Fi, Bluetooth, and/or other wireless protocol. The second wireless antenna may operate according to a different protocol, such as near field communication (NFC) and/or other short range wireless protocol. While described with two different antennas, it will be appreciated that in some embodiments a secondary validator 110 may include only a single antenna that performs the functions of both the first and second wireless antennas. In other embodiments, more than two antennas may be used.

The first wireless antenna may be used to receive information from the primary validation unit 104, the validation detection system 112, and/or other system of a transit vehicle 102. For example, the first wireless antenna may receive some or all of the check in and/or check out information acquired by the primary validation unit 104 and/or information related to the route of a transit vehicle 102 (such as, but not limited to, timestamps, location, and/or bus/route number) when the transit vehicle 102 is within the signal range of the first wireless antenna. In some embodiments, the first wireless antenna may receive indications from the validation detection system 112 that one or more passengers have not successfully checked out of the transit vehicle 102 prior to exiting the transit vehicle 102. In some embodiments, the indications may be tied to a particular passenger, while in other embodiments the indications may be generic indications that at least one passenger has failed to properly check out of the transit vehicle 102 prior to—exiting. In embodiments in which an indication is tied to a particular passenger, the indication may also include an image file that includes an image of at least a portion of the passenger's face.

Typically, the second wireless antenna may be used to receive from and/or write data to fare media. For example, the second wireless antenna may be used to write journey information to the fare media. This may include location information of the secondary validator 110 (such a transit stop, identifier of the secondary validator 110, coordinates of the secondary validator 110, and/or other location data), a timestamp of when the fare media comes within a range of the second wireless antenna, information received from the primary validation unit 104, and/or other data that may be useful for the back office 106 to later calculate a correct fare for a particular transit ride. Once the data is written to the fare media, the fare media may provide the information to a primary validation unit 104 and/or other transit system equipment that has a network connection with the back office 106 during a later interaction (such as a next trip of the passenger associated with the fare media) such that the back office 106 can then properly calculate a transit fare for the trip involving checking out using the secondary validator 110. In such embodiments, as the time between interactions between the fare media and the transit system equipment may be drawn out (or possibly never occur), a proxy transaction or account hold may be performed to account for instances in which a transit fare must be billed prior to the later interaction. If a later interaction then occurs, the charge to the fare media may be adjusted based on the final, accurate fare that is calculated upon receipt of the necessary information.

In other embodiments, the second wireless antenna may be configured to receive information from the fare media during a checkout/tap interaction. For example, the second wireless antenna may receive identifiers of passengers, payment details (which may include account numbers and/or tokens associated with account numbers for a payment account that is linked to and/or otherwise associated with the fare media), stored value data associated with fare media, and/or other information needed to check a fare media out of the transit vehicle 102.

In embodiments in which data is received from a fare media for later transmission to the back office 106 for fare calculation, the first wireless antenna may be further used to transmit any information received from the fare media, information about the secondary validator 110 (such as a location and/or identifier of the secondary validator 110 and/or a timestamp of the interaction with the fare media), and/or the transit vehicle 102 (such as some or all of the check in and/or check out information acquired by the primary validation unit 104 and/or information related to the route of a transit vehicle 102) that transported the passenger of the fare media to the next transit vehicle 102 that arrives within the signal range of the first wireless antenna. For example, if a first transit vehicle 102 delivers the passenger possessing the fare media to a transit stop and the passenger checks out using the secondary validator 110, the secondary validator 110 may utilize the first antenna to send the relevant data to the next transit vehicle 102 (likely to the onboard primary validation unit 104) that stops at the transit stop. This data may then be routed to the back office 106 by the primary validation unit 104. In some embodiments, the passenger may check out at the secondary validator 110 while the original transit vehicle is still within the signal range of the first wireless antenna. In such cases, it may be possible for the secondary validator 110 to pass the relevant information to the original transit vehicle 102 prior to the transit vehicle 102 departing the transit stop.

The first wireless antenna may also be configured to receive various software data from passing transit vehicles 102. For example, software updates for the secondary validator 110 may be received using the first wireless antenna from transit vehicles 102 that are positioned within the signal range of the first wireless antenna. Oftentimes, communications from the secondary validator 110 may be encrypted to protect sensitive information within the communications. For example, communications to fare media and/or transit vehicles 102 may include sensitive user identifying information, payment information, and the like. This information may be encrypted in accordance with PCI-DSS rules by the secondary validator 110 prior to transmission, such as by using encryption key pairs or other known and future encryption techniques. To update the encryption keys, the secondary validator 110 may receive update files from transit vehicles 102 as the transit vehicles 102 come within the signal range of the first wireless antenna.

In this way, using either subsequent interactions with the fare media and/or by receiving transaction details from the secondary validator 110 via one or more primary validation units 104, the back office 106 may receive a full transaction record that is usable to accurately calculate a fare for the fare media when using a secondary validator 110 to check out of the transit vehicle 102, even without any direct connection between the secondary validator 110 and the back office 106.

In some embodiments, the information provided to the back office 106 may only consists of time and location of a checkout. In such embodiments, the back office 106 may then use a time table and live bus tracking information to retrieve journey details (e.g., bus/route number) required to complete the journey and properly calculate a transit fare.

Figure 2:
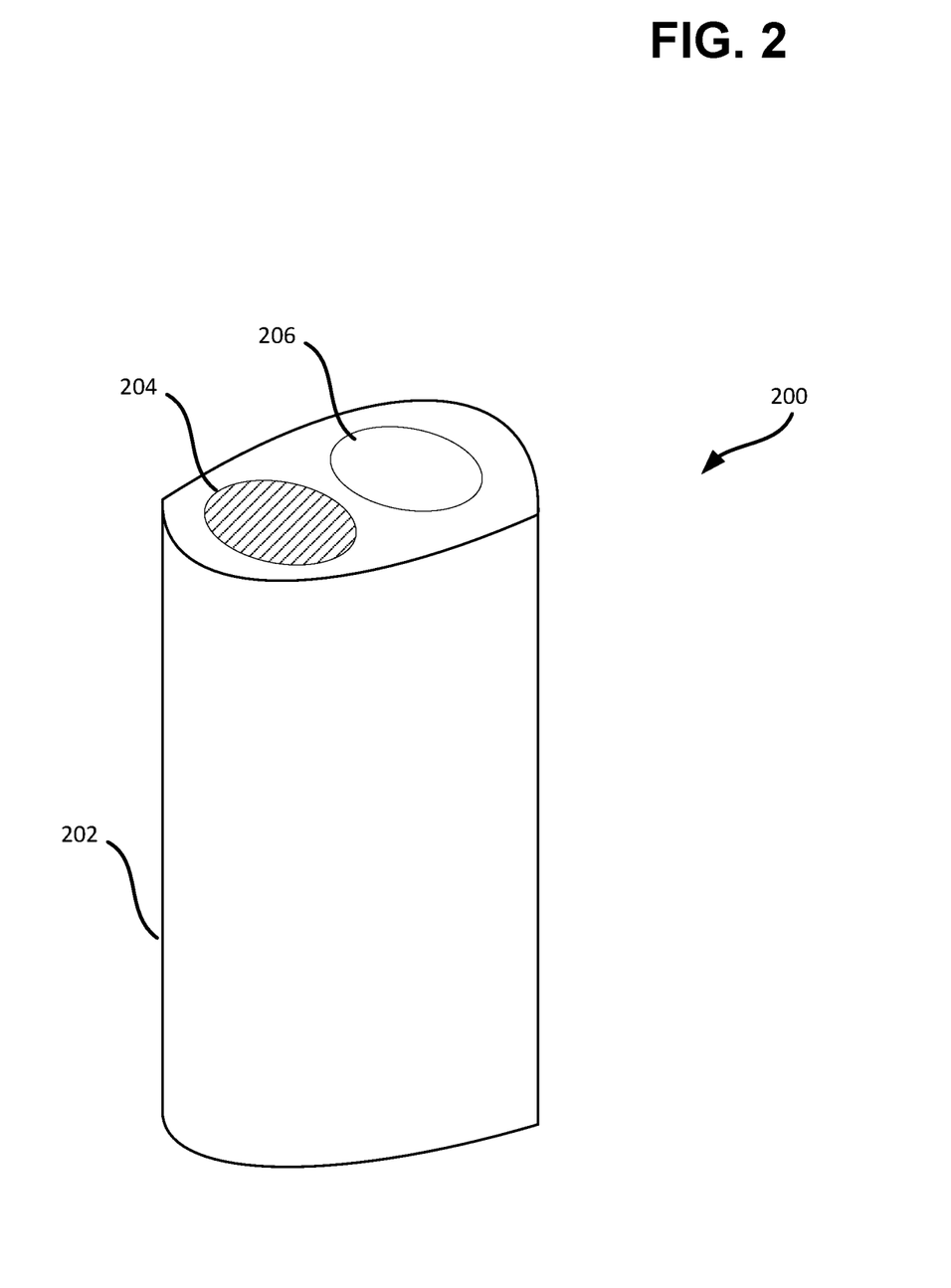
FIG. 2 illustrates a secondary validator according to embodiments of the invention.

FIG. 2 illustrates one embodiment of a secondary validator 200, which may be the same or similar to secondary validator 110 described above. Secondary validator 200 may include a support 202, such as a column, post, and/or other support. Support 202 may provide a housing for and/or elevate a communications interface 204 that includes at least one antenna (such as a first wireless antenna and/or a second wireless antenna). The communications interface 204 may provide a location for passengers to tap and/or otherwise interact with the secondary validator 200 to have data read from and/or written to a fare media. One of the antennas may also be configured for longer range communications with a transit vehicle, primary validation unit, and/or validation detection system as described above in relation to FIG. 1.

In some embodiments, the secondary validator 200 may include a feedback system 206. For example, the feedback system 206 may include a display screen, light system (such as one or more light emitting diodes), a speaker, and/or other audio and/or visual feedback mechanisms. The feedback system 206 may be built into or coupled with the housing of the support 202 and/or may be part of one or more separate devices that are in communication with the secondary validator 200. The feedback system 206 may be configured to provide an indication (such as a reminder) to one or more passengers that the passengers still need to check out, tap out, and/or otherwise validate their fare media after exiting a transit vehicle. For example, the feedback system 206 may be configured to produce an audio and/or visual indication that serves to remind passengers to validate. In some embodiments, such reminders may be provided at all times, such as when the feedback system 206 provides a visual indication that the secondary validator 200 is active and ready to be used (which may be more common when the secondary validator 200 is in the form of a transit gate, such as described in relation to FIG. 3 as the relevant feedback system may indicate the operational status and/or directional status of a fare gate through which all passengers must pass before exiting a transit station and/or boarding area). In other embodiments, the feedback system 206 may provide an indication only when alerted that one or more passengers have failed to successfully check out of the transit vehicle. For example, when the secondary validator 200 is informed by a validation detection system and/or other system of a transit vehicle that one or more passengers have failed to validate prior to exiting, the feedback system 206 may be activated to produce an audio and/or visual indication to alert the passenger(s) that they need to check out using the secondary validator 200.

In some embodiments, this indication may be generic. For example, a light, sound, and/or other message may be produced that indicates that there has been one or more passengers that failed to checkout properly. This may alert and remind any passengers who in good faith have forgotten to checkout of the transit vehicle to do so using the secondary validator 200. In such embodiments, a single indication (which may be repeated) may be produced for a single passenger and/or for multiple passengers, which may help preserve anonymity. In other embodiments, the indications may be directed to specific passengers. For example, along with receiving an indication from the validation detection system that a particular passenger has failed to validate, the secondary validator 200 may also receive an image file (static and/or video) of at least a portion of the passenger's face and/or head. This image file may be reproduced on a display screen of the feedback system 206 such that the specific passenger may be alerted that they have been detected as not checking out of the transit vehicle and must now do so at the secondary validator 200.

In some embodiments, the secondary validator 200 may be configured to switch between a low power state and a fully operational state. For example, when no transit vehicles are within the signal range of the first wireless antenna and/or when no outstanding indications that passengers have failed to validate prior to exiting, the second wireless antenna and/or the feedback system 206 may be deactivated to conserve power and to extend the operating life of the components of the secondary validator 200. In the low power state, the secondary validator 200 may keep the first wireless antenna activated such that the secondary validator 200 may detect the presence of and transmissions from nearby transit vehicles. This allows the secondary validator 200 to always be able to receive software updates and/or other data from transit vehicles. If a transit vehicle is nearby and/or communicates an indication that one or more passengers have failed to properly check out, the secondary validator 200 may move into a fully operational state to activate the second wireless antenna and/or feedback system 206 (and in instances where the secondary validator includes a gate or other physical barrier, these mechanisms may also be powered up).

Figure 3:
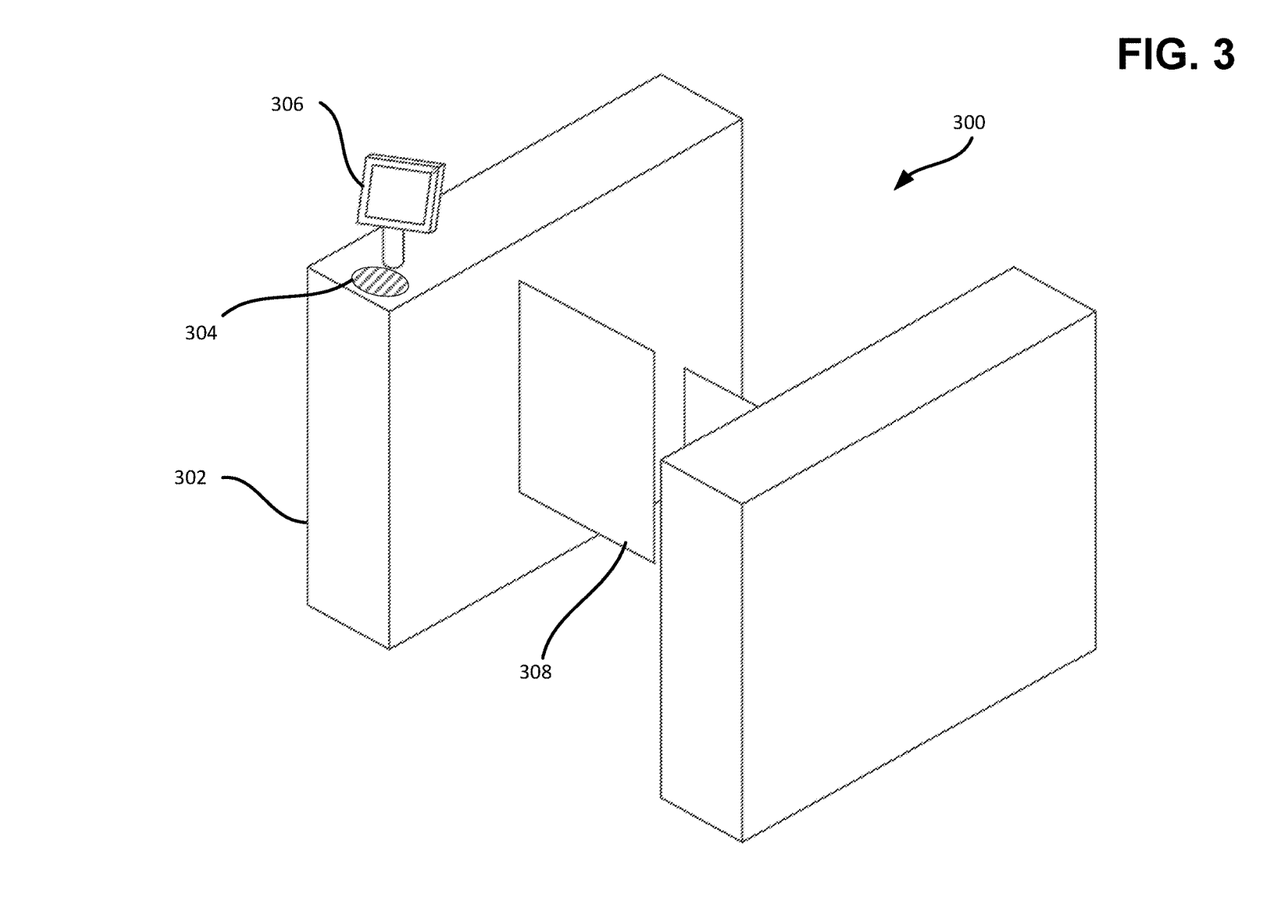
FIG. 3 illustrates a secondary validator according to embodiments of the invention.

FIG. 3 illustrates an embodiment of a secondary validator 300. Secondary validator 300 may be similar to and perform the same or similar functions as described above in relation to secondary validator 200. For example, the second validator 300 may include one or more supports 302 that may house and/or elevate electrical components of the secondary validator 300. The support 302 may provide a communication interface 304 that includes one or more antennas for communicating with fare media and/or systems on a transit vehicle. Additionally, a feedback system 306 may be included on or near (and in communication with) the secondary validator 300 that may provide indications and/or reminders to passengers to checkout and/or otherwise validate their fare media using the secondary validator 300.

Secondary validator 300 further includes one or more barriers 308, such as gates, turnstiles, paddles, and/or other physical barrier mechanisms. These barriers 308 may have a default state, such as unlocked/locked and/or unobstructing/obstructing. If the passenger has been successfully validated, the barrier 308 may be in an unlocked and/or obstructing state. In embodiments where such a state is not the default state, the secondary validator 300 may send a signal to the barrier 308 to switch the barrier 308 to the unlocked (in which a mechanical and/or electrical locking mechanism is disengaged such that the barrier 308 may be opened) and/or unobstructing state (with physical barrier mechanisms moved out of the path of the passenger) such that the user may pass and enter or exit the access controlled area. If the passenger has not been successfully validated, the barrier 308 may be in a locked (in which a mechanical and/or electrical locking mechanism prevents the barrier 308 from being opened) and/or obstructing state (with physical barrier mechanisms moved into of the path of the passenger). In embodiments where such a state is not the default state, the secondary validator 300 may send a signal to the barrier 308 to switch the barrier 308 to the locked and/or obstructing state such that the user may not enter or exit the access controlled area.

Figure 4:
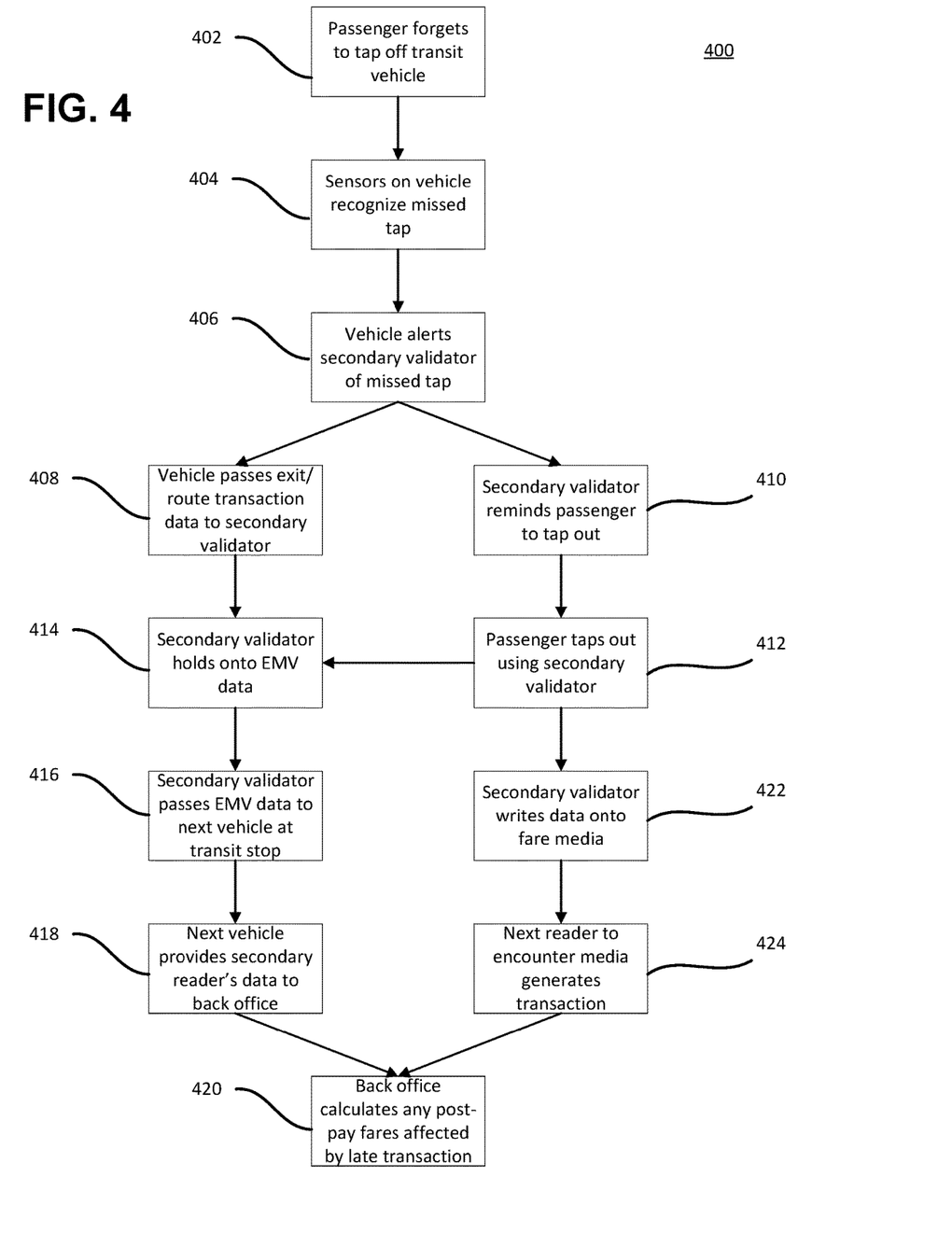
FIG. 4 is a flowchart illustrating a process for validating transit media according to the present invention.

FIG. 4 is a flowchart illustrating a process 400 for validating a fare media according to one embodiment. Process 400 may be performed using any devices and systems described herein. Process 400 may optionally begin at block 402 by one or more passengers forgetting to tap or otherwise check out of a transit vehicle, such as a bus or train. At block 404, sensors on the transit vehicle may detect the missed tap. For example, overhead 3D cameras and/or other imaging sensors may operate alone, or in conjunction with a primary validation unit to detect whether each passenger has properly tapped out prior to exiting the transit vehicle. The transit vehicle may then alert a secondary validator at the transit stop that the passenger failed to tap out at block 406. In some embodiments, the sensors may capture an image of the passenger's face and/or head and pass the image to a secondary validator positioned at the transit stop at which the passenger exited the transit vehicle along with the alert.

At block 408, the transit vehicle (when within a signal range of the secondary validator) may pass exit transaction data and/or other information (such as information associated with a transit passenger and/or fare media and/or information related to the route of a transit vehicle) to the secondary validator. The secondary validator may remind passengers to tap out at block 410, such as by using a feedback system attached to and/or in communication with the secondary validator. In some embodiments, the reminder may include an image of the passenger's face being displayed on a screen of the feedback system. The passenger may tap out using a fare media at the secondary validator at block 412. This may trigger one of two types of behavior.

In a first scenario, such as when the fare media is an EMV card, payment details, such as primary account numbers (PAN), personal identification numbers (PIN), tokens, and/or other sensitive data may be read and stored by the secondary validator (along with the information received from the transit vehicle) at block 414. In such embodiments, the secondary validator may encrypt and pass the payment details (and oftentimes some or all of the data received from the initial transit vehicle) to a transit vehicle (or primary validation unit disposed thereon) within a signal range of the secondary reader at block 416. In some embodiments, this may be the same transit vehicle the passenger has exited from if that vehicle is still at the transit stop. In other embodiments, this transit vehicle may be the next (or other) subsequently arriving transit vehicle. The transit vehicle may then pass the payment details and/or other information to the back office of the transit system at block 418. The back office may then calculate (or recalculate) any fares that are affected by the late check out using the secondary validator 420.

In a second scenario, such as when the fare media is a closed loop (transit system-specific) media, the secondary reader may write data onto the fare media at block 422. This data may include a simple timestamp of the tap out and/or may include an identifier or location of the secondary reader and/or some or all information received from the initial transit vehicle. This data may be later passed to a primary validation unit and/or other reader that has a network link to the back office (such as during a subsequent transit trip) at block 424. Upon reading this information, the primary validation unit and/or other reader may pass the data (which sometimes includes a full exit transaction generated based on the tap data) to the back office, which may then calculate (or recalculate) any fares that are affected by the late check out using the secondary validator 420.

Figure 5:
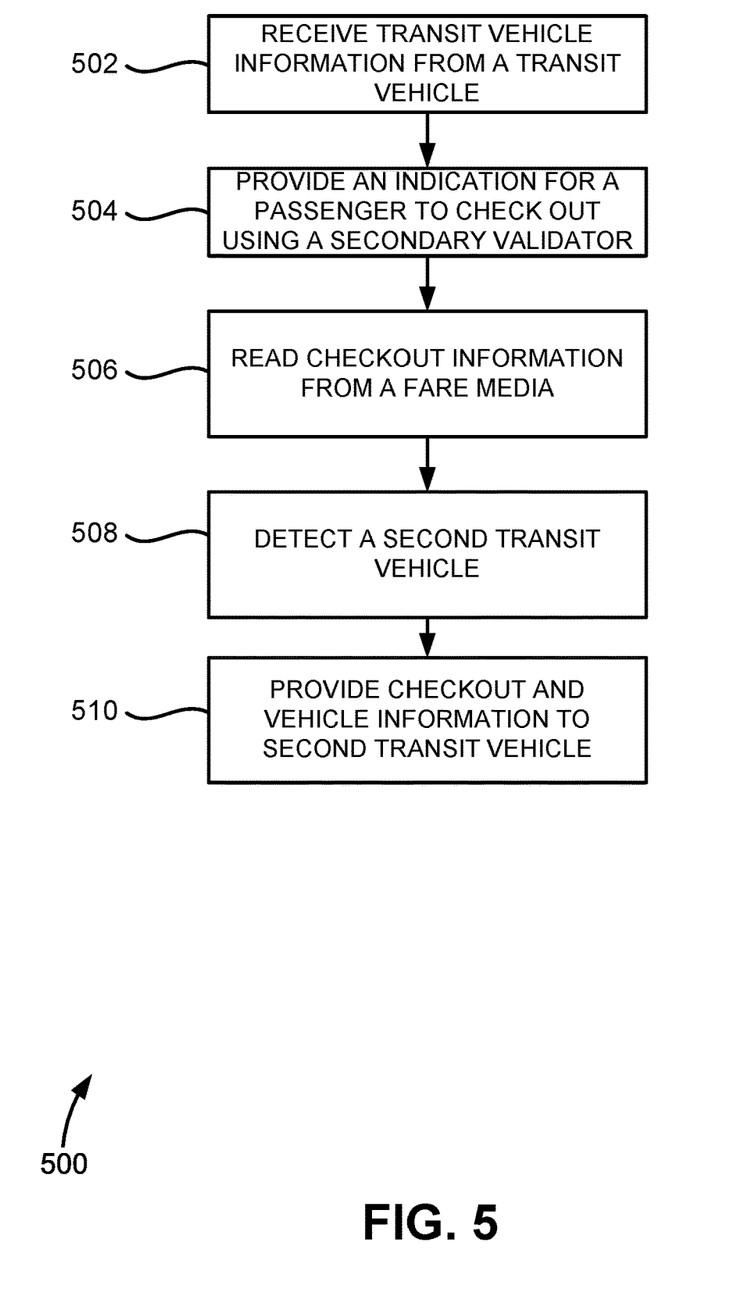
FIG. 5 is a flowchart illustrating a process for validating transit media according to the present invention.

FIG. 5 illustrates a flowchart for a process 500 of validating a fare media. Process 500 may be performed using any of the secondary validators described herein and may optionally include any of the features described in accordance with the embodiments above. Process 500 may begin at block 502 by receiving, using a first wireless antenna of a secondary validator positioned proximate a transit stop, transit vehicle information from a first transit vehicle that is within a signal range of the first wireless antenna. The transit vehicle information may include route information associated with the first transit vehicle. For example, the route information may include timestamps associated with various locations and/or stops of the transit vehicle, route identifiers and/or routing directions of the transit vehicle, real-time and/or historical location data of the transit vehicle. In some embodiments, additional information may be provided to the secondary validator by eat primary validation unit and/or other equipment of the transit vehicle. For example, check-in information associated with fare media that have been present on the first transit vehicle may also be communicated to the secondary validator. Typically, the secondary validator does not have a direct communications link to the transit system back office.

At block 504, an indication may be provided for a passenger that has exited the first transit vehicle to check out using the secondary validator. In some embodiments, such indications may be provided at all times and/or to all passengers, such as when a feedback system of the secondary validator provides a visual indication that the secondary validator is active and ready to be used (which may be more common when the secondary validator is in the form of a transit gate, such as described in relation to FIG. 3. In other embodiments, the feedback system may provide an indication only when alerted that one or more passengers have failed to successfully check out of the transit vehicle. For example, when the secondary validator is informed by a validation detection system and/or other system of a transit vehicle that one or more passengers have failed to validate prior to exiting, the feedback system may be activated to produce an audio and/or visual indication to alert the passenger(s) that they need to check out using the secondary validator. In some embodiments, the indication may include an image of at least a portion of a face of the passenger that has not checked out properly prior to exiting. The image may have been capture and provided to the secondary validator by an imaging device of the first transit vehicle and/or a validation detection system positioned on the transit vehicle.

At block 506, checkout information may be from a fare media using a second wireless antenna of the secondary validator that has a shorter signal range than the first wireless antenna. The checkout information may include a timestamp of the checkout, payment details, identifiers of the fare media and/or passenger, and/or other information that may be relevant to calculate a transit fare for an entire trip. A second transit vehicle present within a signal range of the first wireless antenna may be detected at block 508. In some embodiments, the second vehicle and the first vehicle may be the same, such as when the first vehicle has not left the transit stop by the time the passenger taps out using the secondary validator. In other embodiments, the second vehicle may be the next (or other future) transit vehicle to stop at or otherwise come within a signal range of the first antenna of the secondary validator. At block 510 the checkout information from the fare media and at least a portion of the transit vehicle information is provided to a primary validator positioned on the second transit vehicle for subsequent transmission to a transit system back office. This information (and possibly location information and time information) may be provided using the first wireless antenna of the secondary validator. In some embodiments, the checkout information and the at least a portion of the transit vehicle information may be encrypted prior to providing the information to the primary validation unit of the second transit vehicle.

In some embodiments, process 500 may also include actuating a barrier of the secondary validator after the checkout information is received. For example, a secondary validator may send a signal to the barrier to switch the barrier to an unlocked and/or unobstructing state that allows the now-validated passenger to exit the transit stop.

In some embodiments, such as those in which the secondary validator is merely used as a backup validator to a primary validation unit provided on the transit vehicle, the process 500 may begin with or otherwise include receiving an indication from a validation detection system of the first transit vehicle that a passenger has exited the first transit vehicle without checking out of the first transit vehicle. This indication may also include the image of the face of the passenger who failed to properly checkout. The indication is received while the first transit vehicle is located within the signal range of the first wireless antenna.

Figure 6:
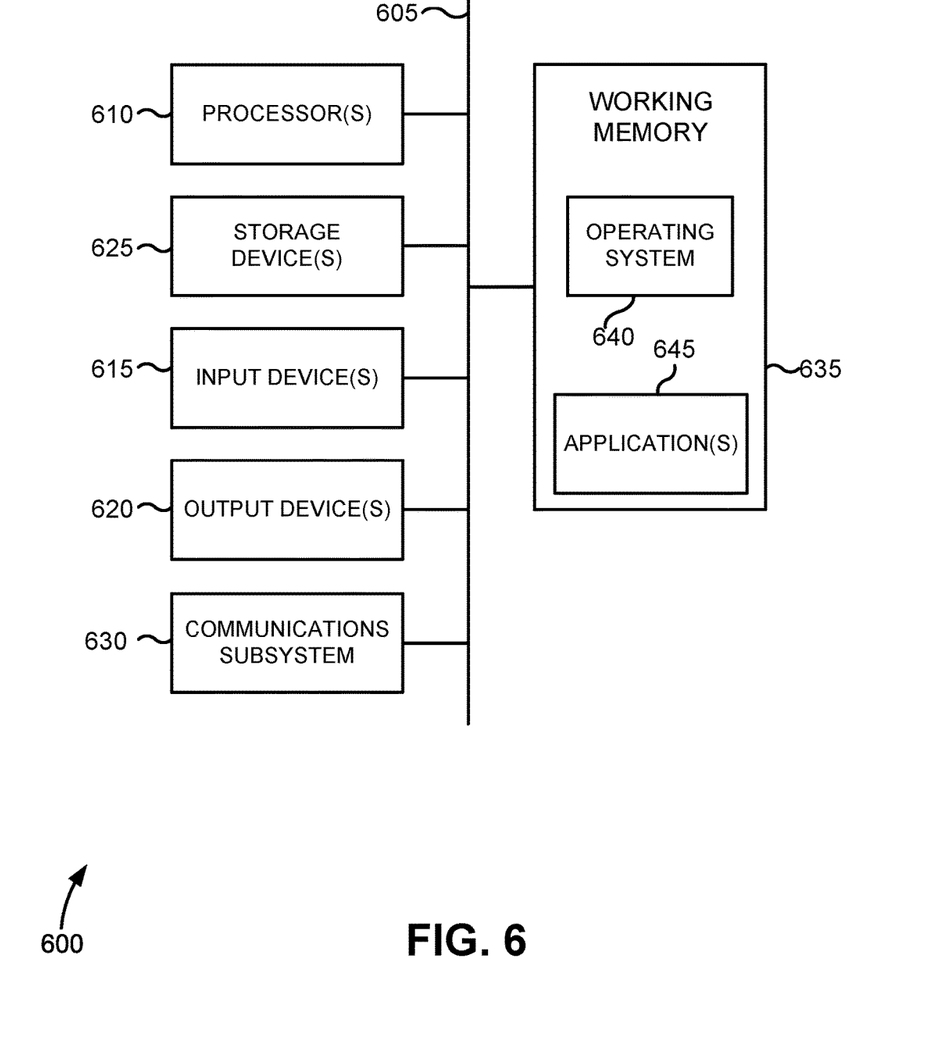
FIG. 6 is a block diagram of a computing system according to embodiments of the present invention.

A computer system as illustrated in FIG. 6 may be incorporated as part of the previously described computerized devices. For example, computer system 600 can represent some of the components of the secondary validators, primary validation units, validation detection systems, and the like described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A secondary validator, comprising:
   a communications interface comprising a first wireless antenna and a second wireless antenna, the first wireless antenna having a greater signal range than the second wireless antenna;
   a processor; and
   a memory having instructions stored thereon that, when executed by the processor cause the secondary validator to:
      receive, using the first wireless antenna, transit vehicle information from a first transit vehicle that is within a signal range of the first wireless antenna, the transit vehicle information comprising route information associated with the first transit vehicle;
      provide an indication for a passenger that has exited the first transit vehicle to check out;
      read checkout information from a fare media using the second wireless antenna of the secondary validator;
      detect a second transit vehicle present within a signal range of the first wireless antenna; and
      provide, using the first wireless antenna, the checkout information from the fare media and at least a portion of the transit vehicle information to a primary validator positioned on the second transit vehicle for subsequent transmission to a transit system back office.

2. The secondary validator of claim 1, further comprising:
   one or both of an audio interface and a video interface, wherein the indication is provided by the one or both of the audio interface and the video interface.

3. The secondary validator of claim 1, wherein:
   the indication comprises an image of at least a portion of a face of the passenger that has been captured by an imaging device of the first transit vehicle.

4. The secondary validator of claim 1, wherein:
   the route information comprises a timestamp of the route information, a current location of the first transit vehicle, and a transit route identifier of the first transit vehicle.

5. The secondary validator of claim 1, wherein:
   the secondary validator does not have a direct communications link to the transit system back office.

6. The secondary validator of claim 1, wherein:
   the indication is indicative that a particular passenger has failed to check out from the first transit vehicle.

7. The secondary validator of claim 1, further comprising:
   a physical barrier, wherein the processor is further configured to cause the secondary validator to manipulate the physical barrier upon receiving the checkout information from the fare media.

8. A method of validating a transit media, comprising:
   receiving, using a first wireless antenna of a secondary validator positioned proximate a transit stop, transit vehicle information from a first transit vehicle that is within a signal range of the first wireless antenna, the transit vehicle information comprising route information associated with the first transit vehicle;
   providing an indication for a passenger that has exited the first transit vehicle to check out using the secondary validator;
   reading checkout information from a fare media using a second wireless antenna of the secondary validator, wherein the second wireless antenna has a shorter signal range than the first wireless antenna;

detecting a second transit vehicle present within a signal range of the first wireless antenna; and providing, using the first wireless antenna, the checkout information from the fare media and at least a portion of the transit vehicle information to a primary validator positioned on the second transit vehicle for subsequent transmission to a transit system back office.

9. The method of validating a transit media of claim 8, wherein:

the indication is indicative that a particular passenger has failed to check out from the first transit vehicle.

10. The method of validating a transit media of claim 8, wherein:

the first transit vehicle and the second transit vehicle are the same; and the second transit vehicle has not moved from the transit stop since the passenger exited.

11. The method of validating a transit media of claim 8, wherein:

receiving an indication from a validation detection system of the first transit vehicle that a passenger has exited the first transit vehicle without checking out of the first transit vehicle, wherein the indication is received while the first transit vehicle is located within the signal range of the first wireless antenna.

12. The method of validating a transit media of claim 8, further comprising:

encrypting the checkout information and the at least a portion of the transit vehicle information prior to providing the checkout information and the at least a portion of the transit vehicle information to the primary validator.

13. The method of validating a transit media of claim 8, further comprising:

actuating a barrier of the secondary validator after the checkout information is received.

14. The method of validating a transit media of claim 8, wherein:

the transit vehicle information comprises check-in information associated with fare media that have been present on the first transit vehicle.

15. A method of validating a transit media, comprising:

receiving, at a first wireless antenna of a secondary validator positioned proximate a transit stop, an indication from a validation detection system of a first transit vehicle that a passenger has exited a first transit vehicle without checking out of the first transit vehicle, wherein the indication is received while the first transit vehicle is located within a signal range of the first wireless antenna;

receiving, using the first wireless antenna, transit vehicle information from the first transit vehicle, the transit vehicle information comprising route information associated with the first transit vehicle;

providing an indication for a passenger that has exited the first transit vehicle to check out using the secondary validator;

reading checkout information from a fare media using a second wireless antenna of the secondary validator, wherein the second wireless antenna has a shorter signal range than the first wireless antenna;

detecting a second transit vehicle present within the signal range of the first wireless antenna; and providing, using the first wireless antenna, the checkout information from the fare media and at least a portion of the transit vehicle information to a primary validator positioned on the second transit vehicle for subsequent transmission to a transit system back office.

16. The method of validating a transit media of claim 15, wherein:

the indication comprises an image of at least a portion of a face of the passenger that has been captured by an imaging device of the first transit vehicle.

17. The method of validating a transit media of claim 15, further comprising:

providing location information and time information to the second transit vehicle.

18. The method of validating a transit media of claim 15, wherein:

the secondary validator does not have a direct communications link to the transit system back office.

19. The method of validating a transit media of claim 15, further comprising:

encrypting the checkout information and the at least a portion of the transit vehicle information prior to providing the checkout information and the at least a portion of the transit vehicle information to the primary validator.

20. The method of validating a transit media of claim 15, wherein:

the checkout information comprises payment details.

\* \* \* \* \*